United States Patent
Snodgrass

(10) Patent No.: US 7,260,100 B1
(45) Date of Patent: Aug. 21, 2007

(54) SYSTEM AND METHOD FOR NET FORMATION AND MERGING IN AD HOC NETWORKS

(75) Inventor: Timothy E. Snodgrass, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 239 days.

(21) Appl. No.: 11/199,451

(22) Filed: Aug. 8, 2005

(51) Int. Cl.
*H04L 12/28* (2006.01)
(52) U.S. Cl. ............... 370/400; 370/321; 370/324; 455/464; 455/502
(58) Field of Classification Search ............... 370/321, 370/324, 376, 395.3, 400, 408, 425, 442, 370/508, 509, 216; 455/464, 502, 509
See application file for complete search history.

(56) References Cited

U.S. PATENT DOCUMENTS

| | | | |
|---|---|---|---|
| 5,719,868 A | 2/1998 | Young | 370/436 |
| 6,331,973 B1 | 12/2001 | Young et al. | 370/337 |
| 6,574,117 B1 | 6/2003 | Lebo | 361/801 |
| 6,577,641 B1 | 6/2003 | Izumi | 370/442 |
| 6,580,730 B1 | 6/2003 | Loukianov | 370/522 |
| 6,600,754 B1 | 7/2003 | Young et al. | 370/459 |
| 6,631,124 B1 | 10/2003 | Koorapaty et al. | 370/337 |
| 6,665,189 B1 | 12/2003 | Lebo | 361/730 |
| 6,741,466 B1 | 5/2004 | Lebo | 361/687 |
| 6,747,866 B1 | 6/2004 | Lebo et al. | 361/679 |
| 6,791,994 B1 | 9/2004 | Young et al. | 370/436 |
| 6,801,513 B1 | 10/2004 | Gibbons et al. | 370/337 |
| 6,810,022 B1 | 10/2004 | Young | 370/280 |
| 6,816,562 B2 | 11/2004 | Atkinson et al. | 376/39 |
| 6,868,058 B1 * | 3/2005 | Cooper et al. | 370/216 |
| 2002/0067709 A1 | 6/2002 | Yamada et al. | 370/337 |
| 2003/0115369 A1 | 6/2003 | Walter et al. | 709/253 |
| 2003/0165155 A1 | 9/2003 | Johnson et al. | 370/442 |
| 2003/0202541 A1 * | 10/2003 | Lim et al. | 370/503 |
| 2004/0057407 A1 | 3/2004 | Balachandran et al. | 370/336 |
| 2004/0125784 A1 | 7/2004 | Lee et al. | 370/345 |
| 2004/0152478 A1 | 8/2004 | Ruohonen et al. | 455/502 |
| 2005/0086384 A1 * | 4/2005 | Ernst | 709/248 |
| 2005/0111350 A1 * | 5/2005 | Kano | 370/216 |

OTHER PUBLICATIONS

Mathstar™, Silicon Objects Software Development Environment, Oct. 1-6, 2003. Mathstar™, Field Programmable Object Arrays, Aug. 1-20, 2004.

(Continued)

*Primary Examiner*—Matthew D. Anderson
*Assistant Examiner*—Tan Trinh
(74) *Attorney, Agent, or Firm*—Nathan O. Jensen; Kyle Eppele

(57) ABSTRACT

A method of allocating communication resources among nodes in a network is provided. Communication among the nodes uses a time division multiple access protocol that includes a plurality of time slots. After identifying and synchronizing with a first communication node, a search algorithm is executed. The search algorithm allocates one or more time slot of the plurality of time slots to communicate control information with the identified first communication node and allocates the remaining time slots of the plurality of time slots to identification of a second communication node. Upon identification of and synchronization with the second communication node, a merged network is formed. Execution of the search algorithm continues until a desired confidence level is achieved. The confidence level estimates the likelihood that another communication node capable of communication with the network has not been identified. A communication algorithm utilizing otherwise wasted time slots is executed if the desired confidence level is achieved.

20 Claims, 6 Drawing Sheets

OTHER PUBLICATIONS

"The Software Defined Radio (SDR) in Network Centric Operations (NCO)" by Alan C. Trimble, Ph.D. being presented a the IEEE, Oct. 2005.

U.S. Appl. No. 10/198,361 entitled "Ruggedized Electronics Sub-System Module" and having inventor Steve I. Lebo; filed Jul. 18, 2002.

U.S. Appl. No. 10/197,737 entitled "Ruggedized Electronics Module Cooling System" and having inventors Steve I. Lebo and Scott J. Sellner; filed Jul. 18, 2002.

U.S. Appl. No. 10/229,941 entitled "Modular Communication Platform" and having inventor Richard D. Spring, Timothy E. Snodgrass, Robert R. Jakoubek and Steve I. Lebo; filed Aug. 28, 2002.

* cited by examiner

SYSTEM AND METHOD FOR NET FORMATION AND MERGING IN AD HOC NETWORKS

FIELD OF THE INVENTION

The subject of the disclosure relates generally to ad hoc network formation. More specifically, the disclosure relates to a method for improved net formation and merging of ad hoc networks that lack a common time reference.

BACKGROUND

The radio spectrum is a finite resource expected to accommodate ever increasing numbers of communication nodes whether in a commercial environment or in a military environment. Tactical military and commercial applications require self-organizing, wireless networks that can operate in dynamic environments and provide peer-to-peer communications. For multiplexed communication systems, the communication system typically consists of many communication nodes that require active service over a single communication channel. As a result, a variety of multiple access schemes have been devised that allow multiple users to share the same communication channel. For example, communication systems have been developed to provide communication between many communication nodes for brief intervals of time using the same communication channel. Such a multiple access scheme is known as Time Division Multiple Access (TDMA) protocol. A communication system that employs TDMA is referred to herein as a TDMA system or a TDMA network.

A TDMA communication system can be used in conjunction with other types of multiple access systems including frequency division multiple access and code division multiple access systems. For example, frequency hopping using a frequency synthesizer to "hop" the signal from one frequency to the next can be used in a TDMA communication system to improve performance characteristics including providing a low probability of intercept and reducing the effects of co-channel interference, multi-path, and fading. The communication nodes are synchronized to follow a frequency hopping code thereby ensuring that the communication nodes are on the same frequency at the same time. The hopping pattern may be assigned to each node in its identification code. As a result, it is difficult for a communication node that does not know the frequency hopping code to synchronize with the other communication nodes.

An advantageous characteristic of a TDMA system is the ability of neighboring nodes to transmit without interference. In a TDMA system, each carrier frequency is divided into repeating frames. The frames are subdivided into a plurality of time slots. A communication node within the TDMA system is assigned one or more time slots for transmitting and/or for receiving a communication signal. Each communication node is assigned particular time slots in a continuum of recurrent frames for transmission of its bursts and for reception of the bursts of other nodes. The time slots are designed to be non-overlapping when the various nodes' signals arrive at the receiver, and thus, include a time delay for a signal propagation time. A base radio may manage all of its assigned communication nodes by keeping the nodes synchronized and allowing each node to communicate at a known, or deterministic, time. Alternatively, the communication nodes may use a self-organizing system to allocate time slots and to maintain synchronization with each other. For example, the Unifying Slot Assignment Protocol (USAP), which is disclosed in U.S. Pat. No. 5,719,868, provides a protocol for maintaining such a self-organizing communication system.

Mobile, multi-hop, broadcast packet radio networks provide rapid and convenient deployment, self organization, mobility, and survivability. In this type of network, a transmission from one node is broadcast to all nodes in its "neighborhood". With the growth in the number of communication nodes, the need to quickly form and/or merge formed networks as nodes move into a neighborhood has increased. Ultra-high frequency (UHF) systems generally have a neighborhood defined by nodes within line of sight of the transmitting node. For illustration, FIG. 1 depicts an overlapping neighborhood system 10 that includes a first neighborhood 18, a second neighborhood 20, and a third neighborhood 22. The first neighborhood 21 includes nodes 1-5 and f that are within line of sight of node 3. The second neighborhood 22 includes nodes 2, 3, 5, a, c, d, and f that are within line of sight of node f. The third neighborhood 23 includes nodes a, b, c, d, e, f, and g that are within line of sight of node c. A node in the first neighborhood 21 can communicate with a node in the third neighborhood 23 using multiple "hops" from a node in the second neighborhood 22. All of the nodes in the overlapping neighborhood system 10 or even within a neighborhood may not be in communication with each other. For example, two networks encompass the communication nodes of system 10. A first network 12 includes nodes 1-5 that are in communication with each other, and a second network 14 includes nodes a, b, c, d, e, f, and g that are in communication with each other. Multiple hops may be required, for example, to provide communication between node f and node e. The second neighborhood 20, however, includes nodes 2, 3, and 5 that are not currently in communication with node f as indicated by the broken lines. The ability to first form the networks 12 and 14 and then to merge network 12 with network 14 in a time and a power efficient manner is an important function of a TDMA system.

To avoid interference between the transmissions from different communication nodes, a TDMA system requires good clock synchronization between the communication nodes. Timing acquisition is a process for synchronizing the receiver's clock with the transmitter's clock so that the receiver can determine the boundary between two transmitted symbols. In general, timing acquisition is performed by sending a preamble before information bits in a TDMA frame. Additionally, each communication signal transmitted in a time slot includes a predefined synchronization word. The synchronization word must be matched in order to validate the communication that follows. If no match is achieved, the information can not be processed from the communication signal. By identifying the location of the synchronization word in a received signal, a node maintains synchronization with the other nodes in the network. This scheme requires a reasonably accurate clock timing recovery before frame synchronization (or any form of communication) can take place. Any false or missed detection of the synchronization pattern results in a loss of the information in the data frame. This poses a particular problem in a TDMA system operating in a dynamic environment in which nodes move in and out of neighborhoods because the new node must synchronize with the TDMA system before communication between the new node and the TDMA system can be accomplished.

For example, to establish synchronization with a new node in a neighborhood comprising an active network such as the node f relative to network 12, a frame synchronization pattern is periodically inserted into the data stream by a transmitter within the first network 12. In an example protocol, once every few seconds a network synchronization time slot is allocated to transmit the frame synchronization pattern. A communication node within the first network 12 may pseudo randomly transmit the network synchronization information. The remaining communication nodes in the first network 12 listen. The node f may similarly transmit synchronization information for the second network 14. Based on statistical theory, the first network 12 and the second network 14 can be merged within an expected time delay assuming that both the first network 12 and the second network 14 are using the same TDMA protocol, for example, based on one of the nodes a, c, d, or f receiving the network synchronization information from a node (for example, nodes 2, 3, or 5) included in the first network 12 or a node included in the first network 12 receiving the synchronization information from one of the nodes a, c, d, or f.

After a communication node is powered on, the node uses 100% of its receiver time to search for other nodes with which to form an ad hoc network. The communication node is also transmitting a status message in a pseudo random manner for reception by other nodes that may be listening. With some time delay, the communication node finds another node's status transmission or vice versa, and the two nodes form a "sub-network". Information begins to flow between the two communication nodes using most of the available communication resources in order to maintain network efficiency. Currently, only a small percentage of the communication resources are reserved to allow each node to "look around" and identify other nodes within the neighborhood that may be transmitting a status message. As a result, such a search-and-make-a-network algorithm forms many sub-networks. The initial sub-network may form relatively quickly, but the statistical opportunities to locate and to communicate with other nodes or sub-networks drops significantly based on the reduction in allocated resources resulting in significant time delays before other nodes or sub-networks in the same neighborhood join the sub-network or form a common network.

A common and accurate representation of time is assumed in determining the likelihood of successful synchronization and the expected time delay associated with forming a network such as the first network 12 and with merging, for example, the first network 12 with the second network 14. If, however, the clock of the second network 14 is not synchronized with sufficient accuracy to the clock of the first network 12, significant time delays (possibly on the order of hours or even days) can result before synchronization between the first network 12 and the second network 14 is completed. Significant delays may result due to clock inaccuracies of as little as 100 µs. What is needed, therefore, is a system and a method that improve the formation of a network that includes the communication nodes within a neighborhood. What is further needed is a system and a method that improve the merging of formed networks into a single network. What is further needed is a system and a method that reduce the waste of communication resources.

SUMMARY

A particular example of the invention provides a method for improving the process of forming a communication network and of merging communication nodes within two or more networks into a single network. To improve the ability to form a communication network and to merge networks, communications between identified nodes are initially limited to the transmission of control information. Remaining communication resources are allocated to search for additional nodes in the neighborhood of the identified nodes until a confidence level is achieved. The confidence level estimates the likelihood that a communication node capable of communication with the identified nodes has not been identified. Such a utilization of communication resources statistically decreases the time delay associated with forming a network of nodes. To further improve the ability of a communication node (or an existing network) to merge with an existing network, otherwise wasted time slots within the network are used to listen for network synchronization information from nodes not currently synchronized with the existing network. As a result, the time delay associated with synchronizing with a new communication node is reduced in a statistical sense. Additionally, because otherwise wasted time slots are utilized, the synchronization performance improvement is achieved in a power efficient manner.

An exemplary embodiment of the invention relates to a method of allocating communication resources between communication nodes in a network of communication nodes to rapidly identify a new node capable of communication with the network. The method uses a TDMA protocol to allocate time slots among communication nodes in the network. The method includes, but is not limited to, (a) executing a first search algorithm, (b) identifying a second communication node, (c) synchronizing with the second communication node to form a network including a first communication node and the identified second communication node, (d) calculating a confidence level wherein the confidence level estimates the likelihood that a third communication node capable of communication with the network has not been identified, (e) comparing the calculated confidence level to a desired confidence level, and, (f) if the desired confidence level is not achieved, repeating (a)-(f). The first search algorithm allocates one or more time slot of the plurality of time slots to communicate control information with the first communication node and allocates the remaining time slots of the plurality of time slots to identify the second communication node.

The method may further include executing a communication algorithm if the desired confidence level is achieved. The communication algorithm includes receiving an allocated set of time slots for transmission of a communication signal, identifying a time slot of the allocated set of time slots that is no longer needed for transmission of the communication signal, and tuning to a network synchronization frequency during the identified time slot. The communication algorithm may further include receiving, during the identified time slot, a synchronization signal transmitted by a fourth communication node, wherein the fourth communication node is not in communication with the second network, and synchronizing with the fourth communication node using the synchronization signal thereby allowing communication between the fourth communication node and the second network.

Another exemplary embodiment of the invention includes a communication node having a communication processing module that implements the operations of the method. Yet another exemplary embodiment of the invention includes computer-readable instructions that, upon execution by a processor, cause the processor to implement the operations of the method.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals will denote like elements.

DETAILED DESCRIPTION

Figure 1:
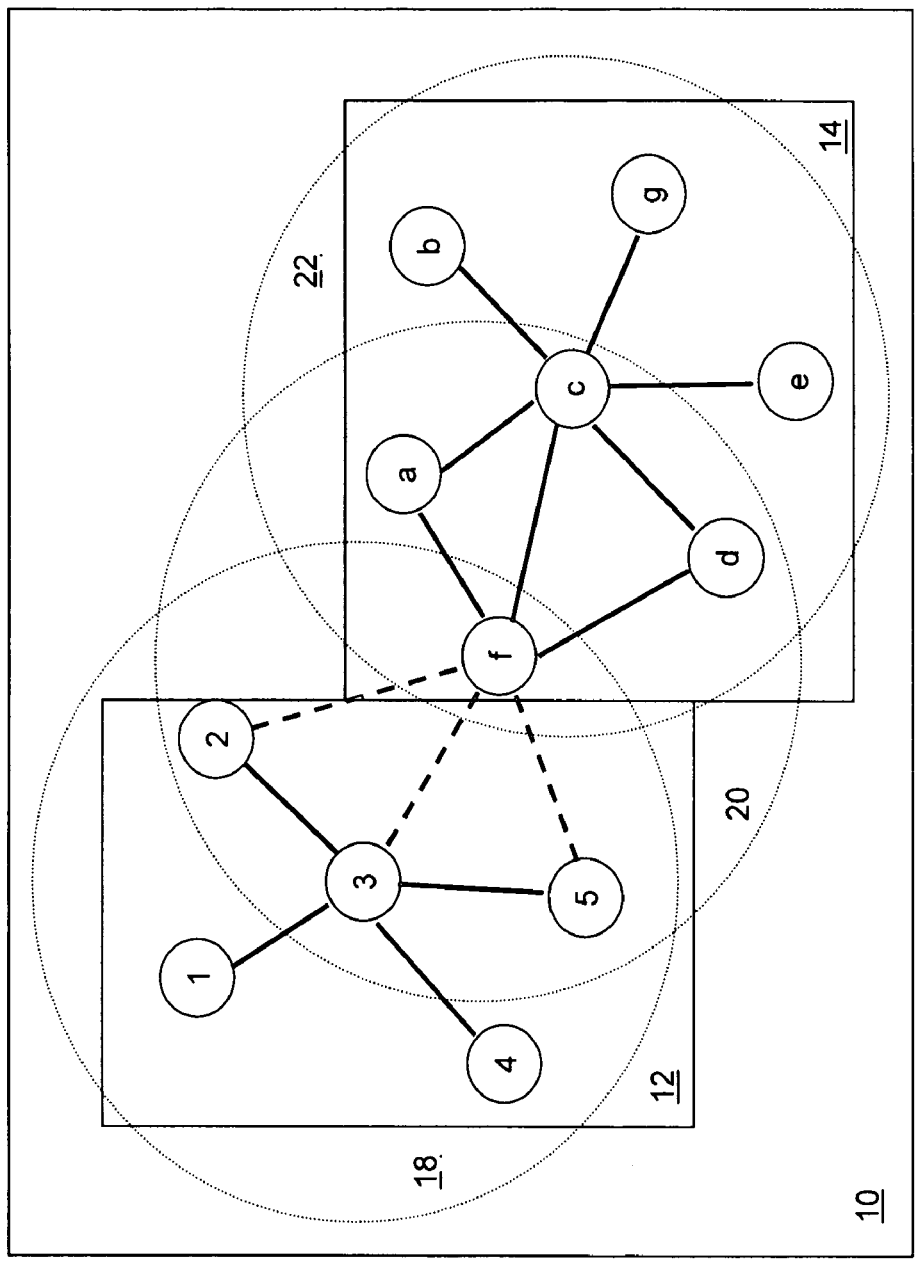
FIG. 1 is a block diagram of nodes within multiple networks that are capable of merging into a single network.
Figure 2:
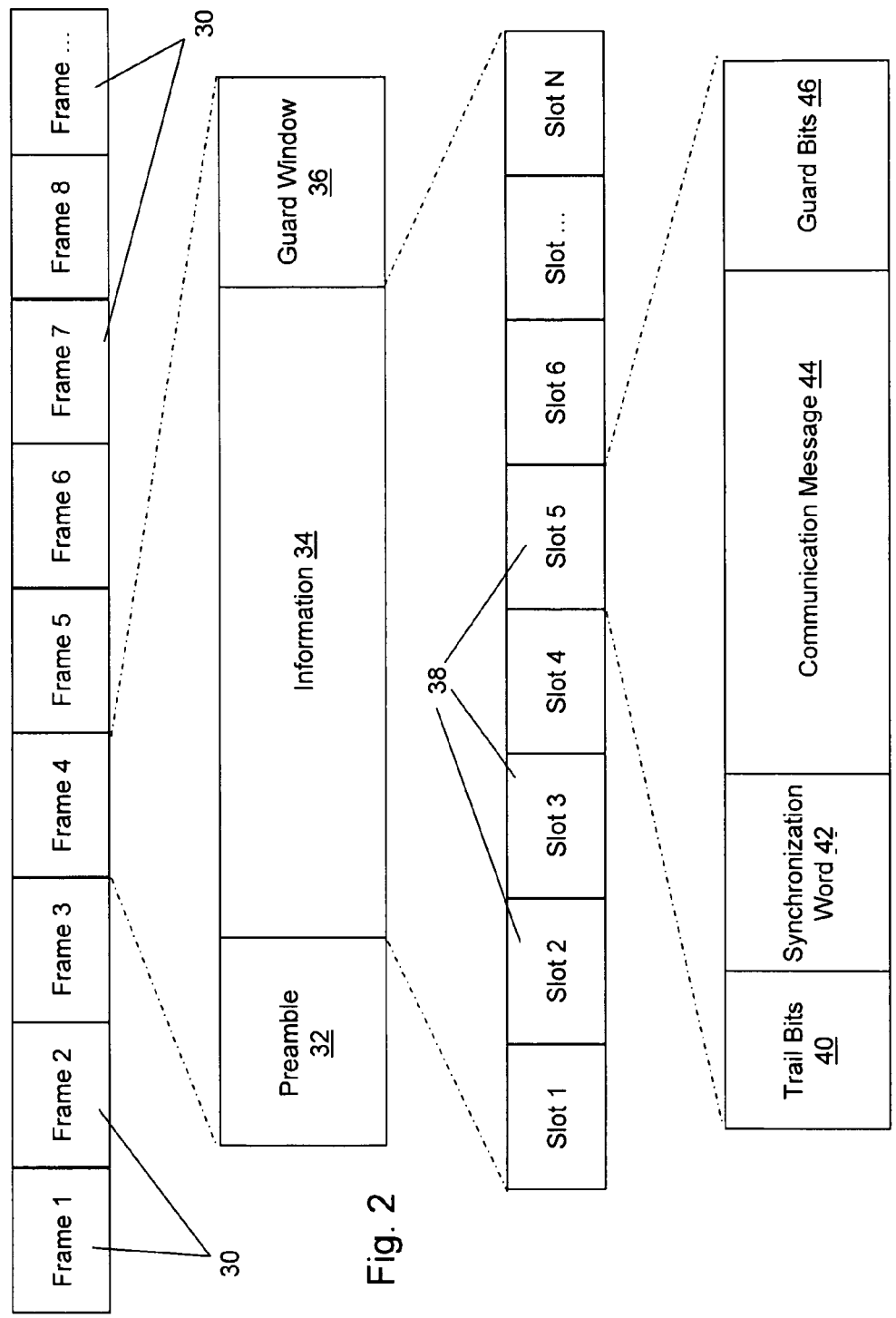
FIG. 2 is a general block diagram of an exemplary TDMA protocol structure.

As shown with reference to FIG. 2, using an exemplary TDMA protocol, each carrier frequency is divided into a plurality of frames 30 of a specific time duration. Each TDMA frame 30, for example, includes a preamble 32, information 34, and a guard window 36. Further, each frame 30 may include a plurality of frequencies. The information 34 is subdivided into a plurality of time slots 38. Each time slot 38, for example, includes trail bits 40, a synchronization word 42, a communication message 44, and guard bits 46. For example, with reference to FIG. 1, the communication nodes 1-5 within the first network 12 are assigned one or more time slots 38 for transmitting the communication message 44. The communication message 44 may be data or a voice communication between the communication nodes 1-5, may be control information for forming the first network 12, or may be a synchronization signal for identifying other communication nodes not communicating with the first network 12. The control information is used by the communication nodes 1-5 for timekeeping (i.e., synchronization acquisition, doppler-differential determination, doppler correction, etc.) and for scheduling of communications. Each communication node is assigned a set of time slots of the time slots 38 in a continuum of frames 30 for transmission of its communication information that may include transmission of the synchronization signal.

Assignment of the time slots 38 may be accomplished using a variety of protocols as known to those skilled in the art. The protocol can be further subdivided into multiple cycles. For example, a bootstrap cycle and a broadcast cycle each of one second duration can be included as part of the TDMA protocol. Each cycle may have the same or a different duration and support different communication functions. For example, the bootstrap cycle includes information transmitted to each communication node that allocates the time slots among the nodes. The broadcast cycle includes the allocated time slots for broadcast transmission between the communication nodes. The number of cycles, the length of the cycle, the length of each frame, the number of time slots, the subdivisions of the time slots, etc. is a matter of design choice, and should not be viewed as limiting; other numbers of cycles, frame lengths, time slot subdivisions, etc. may be used without departing from the scope of the present invention.

Figure 3:
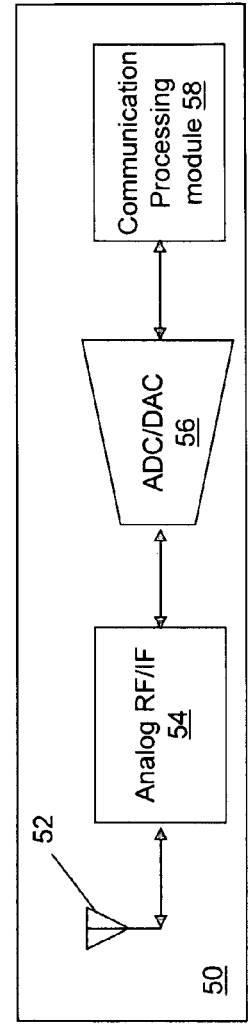
FIG. 3 is a block diagram of a communication node in accordance with an exemplary embodiment.

With reference to FIG. 3, a communication node 50 in accordance with an exemplary embodiment is shown. Communication node 50 includes, but is not limited to, a transceiver antenna 52, an analog RF/IF filter 54, an analog-to-digital converter/digital-to-analog converter (ADC/DAC) 56, and a communication processing module 58. Communication node 50 may provide communication capabilities across the entire communication spectrum or across only a portion of the spectrum. In operation, a communication signal is received by transceiver antenna 52, filtered from a transmission radio frequency (RF) to an intermediate frequency (IF) by the analog RF/IF filter 54, converted from an analog signal to a digital signal by ADC/DAC 56, and demodulated and otherwise processed by the communication processing module 58 to extract information. Similarly, in a reverse procedure, digital data formed and modulated by the communication processing module 58 is sent to the ADC/DAC 56, converted from a digital signal to an analog signal by the ADC/DAC 56, filtered from IF to RF by the analog RF/IF filter 54, and transmitted by the transceiver antenna 52. In an alternative embodiment, the signal transmitted/received is digital and no ADC/DAC 56 is included. In another alternative embodiment, the communication node 50 may include separate transmit and receive antennas. Additional components may be utilized by the communication node 50. For example, the communication node 50 includes one or more power source that may be a battery.

As discussed previously with reference to FIG. 2, each communication node 50 is assigned selected time slots for transmission based on the communication requirements at the node. Each communication node 50 is able to receive in time slots that it has not been assigned to transmit. A communication node 50 may have more than one time slot either consecutive or spaced within one or more frame 30. One communication node 50 may be designated to serve as a time reference, synchronizing the time base of the other communication nodes operating within the first network 12 to the same time. Any communication node 50 can serve as the time reference. Alternatively, the first network 12 may be self organizing.

Figure 4:
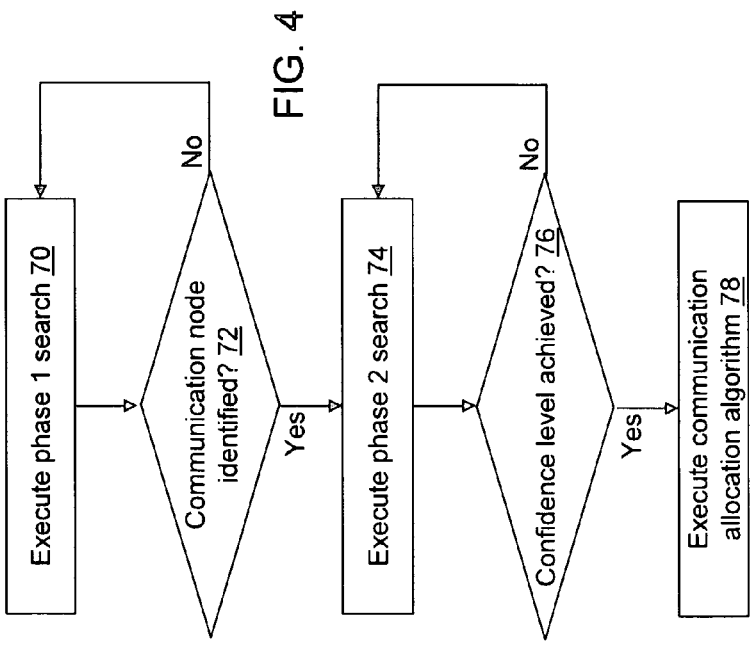
FIG. 4 is a flow diagram illustrating exemplary operations of a multi-phase time slot allocation algorithm executed at the communication node of FIG. 3 using the TDMA protocol structure of FIG. 2 in accordance with an exemplary embodiment.

With reference to FIG. 4, exemplary operations of a multi-phase time slot allocation algorithm utilizing time slots allocated for use by any communication node 50 within the first network 12 are described. The exemplary operations apply also to any communication node 50 within the second network 14. In an operation 70, the communication node 50, such as node 13 shown with reference to FIG. 6, allocates 100% of its communication resources (i.e. time slots) to a search for neighboring nodes such as nodes 11, 15, 17, and 19. In an operation 72, a determination is made concerning identification of a neighboring communication node. If no neighboring communication node is identified, the node 13 continues to use 100% of its communication resources to a search for neighboring nodes. If a neighboring communication node is identified, the node 13 executes a phase 2 search algorithm at operation 74. For example, node 13 identifies node 11 to form an ad hoc network 110 as shown with reference to diagram B of FIG. 6. The phase 2 search algorithm is shown in greater detail with reference to FIG. 5. In an operation 76, a determination is made concerning achievement of a confidence level. If the confidence level is not achieved, node 13 continues to execute the phase 2 search algorithm at operation 74. If the confidence level is achieved, the node 13 executes a communication allocation algorithm at operation 78. The communication allocation algorithm is shown in greater detail with reference to FIG. 8.

Figure 5:
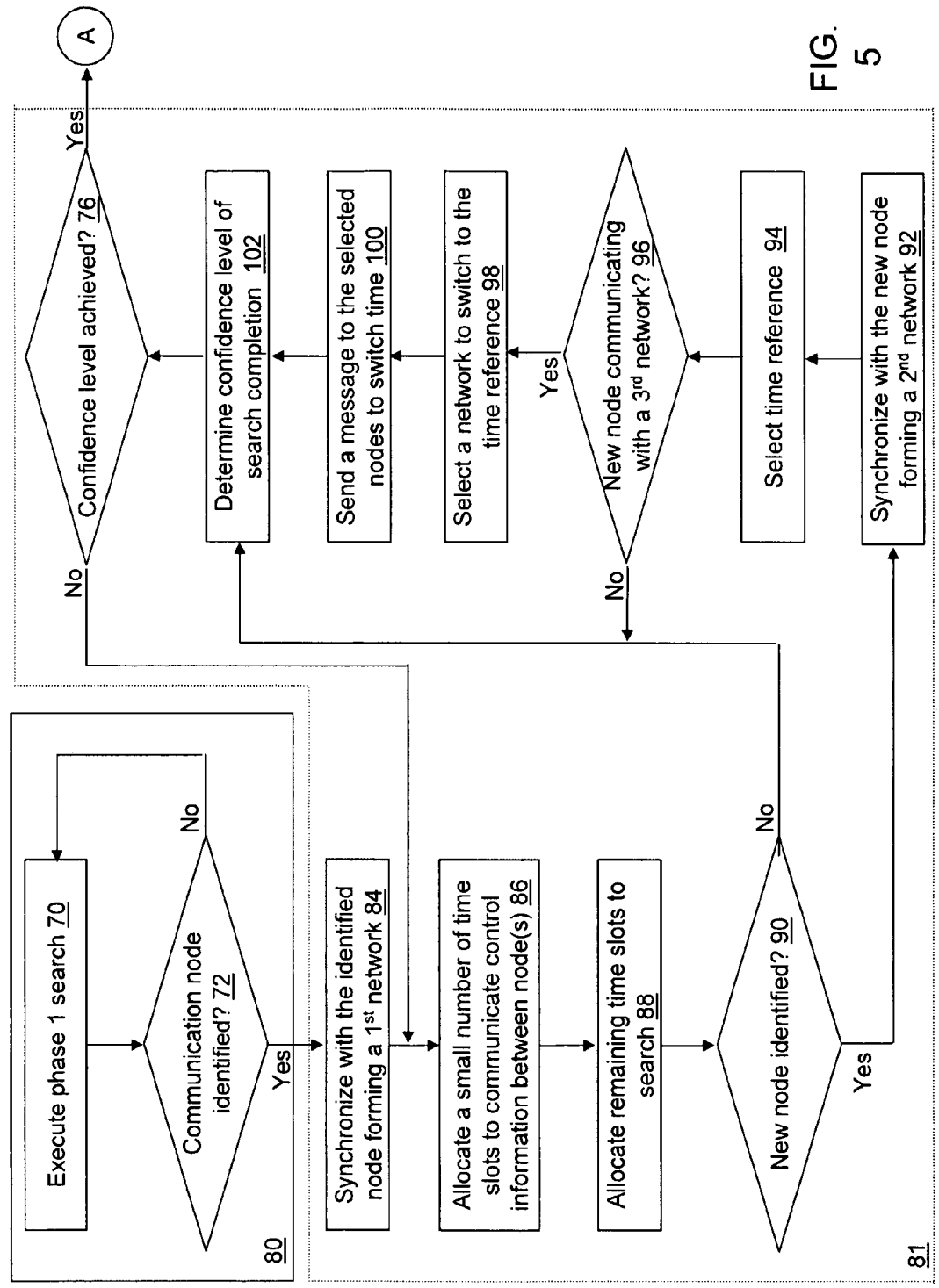
FIG. 5 is a flow diagram illustrating exemplary operations of a phase 2 search allocation algorithm in accordance with an exemplary embodiment.
Figure 6:
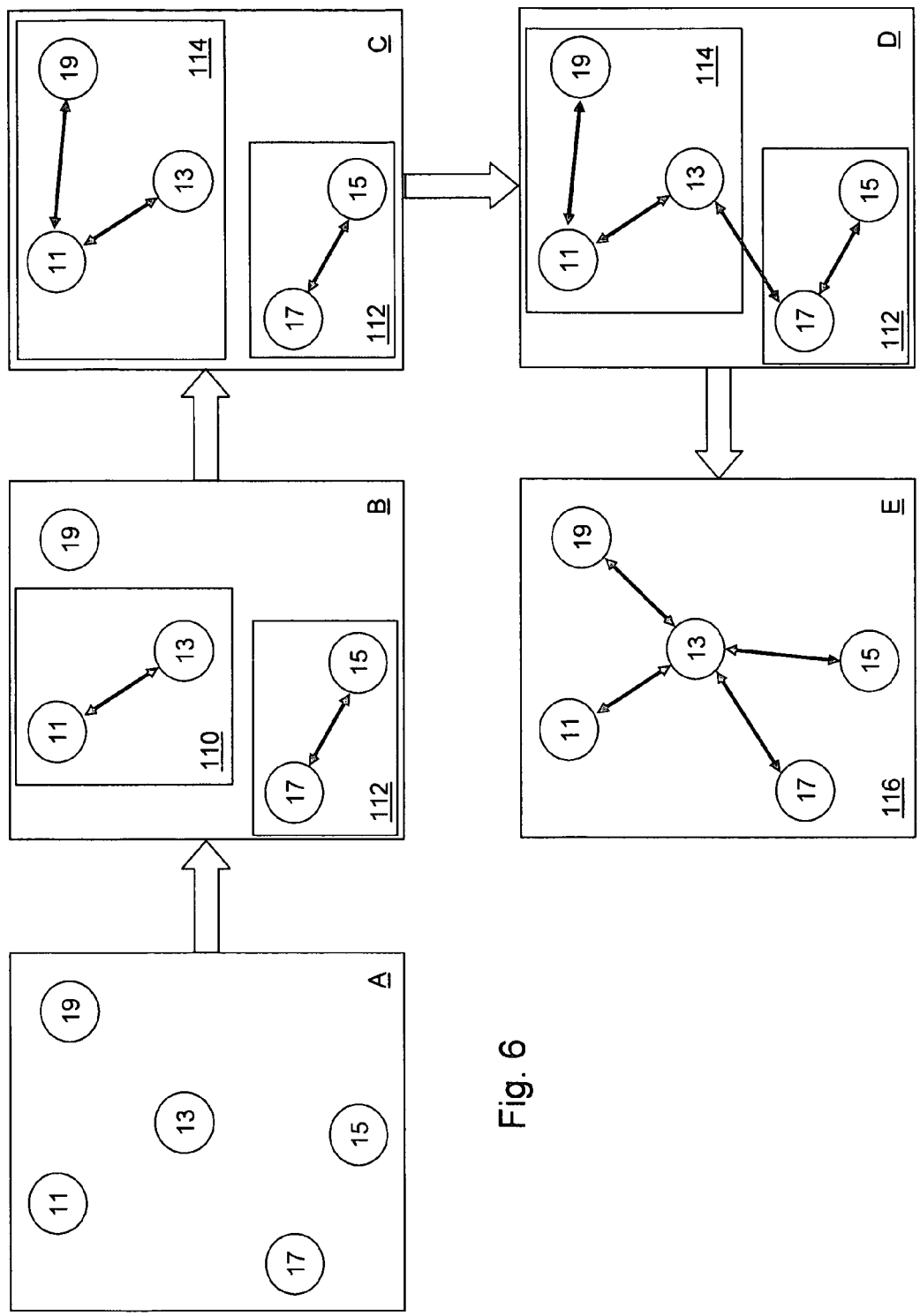
FIG. 6 is a sequence of block diagrams of nodes merging to form a single network using the operations of FIG. 5 in accordance with an exemplary embodiment.
Figure 8:
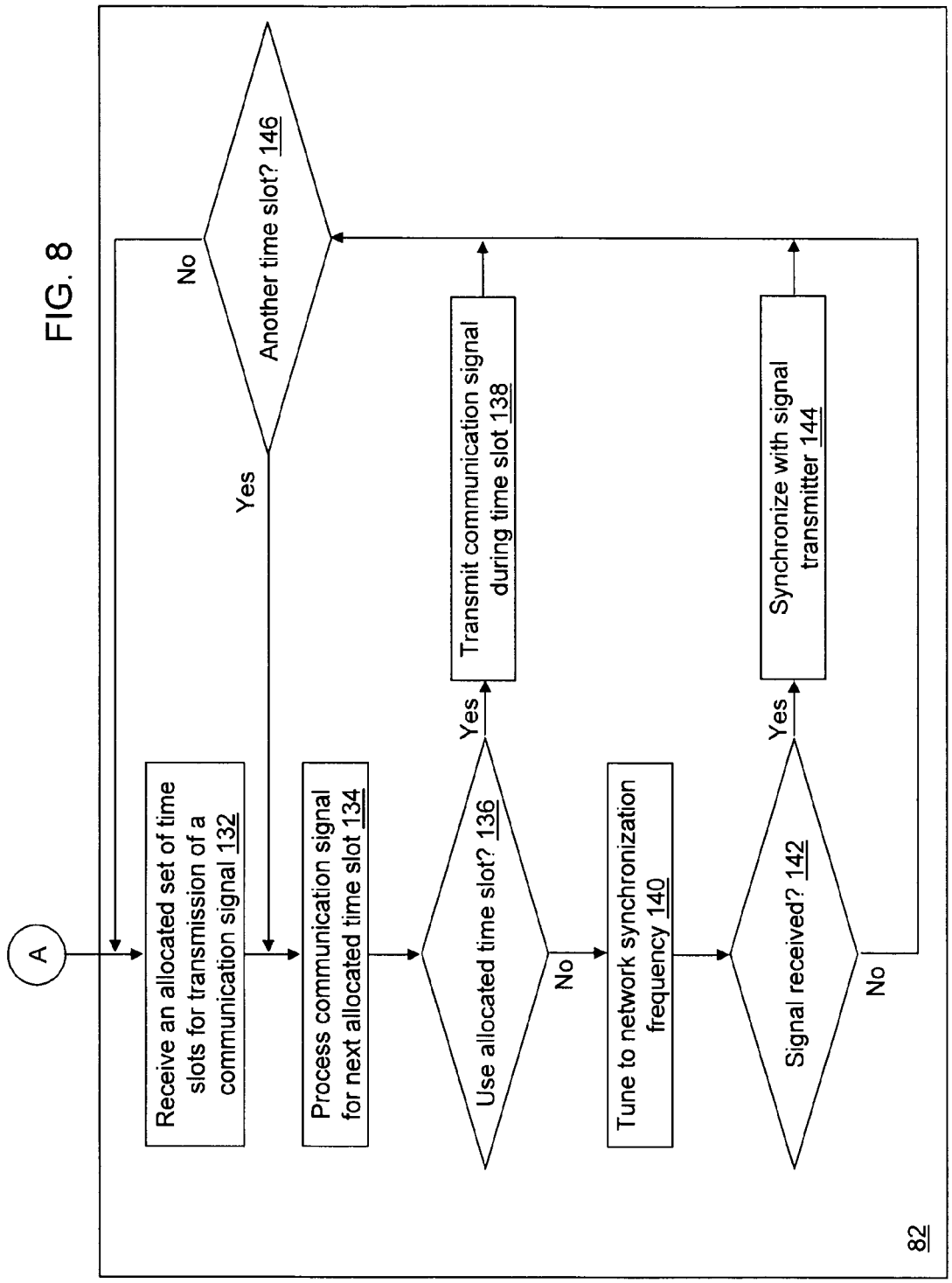
FIG. 8 is a flow diagram illustrating exemplary operations of a communication allocation algorithm executed at the communication node of FIG. 3 using the TDMA protocol structure of FIG. 2 in accordance with an exemplary embodiment.

With reference to FIG. 5, exemplary operations of a multi-phase time slot allocation algorithm utilizing time slots allocated for use by any communication node 50 are described. The multi-phase time slot allocation algorithm includes a phase 1 search algorithm 80, a phase 2 search algorithm 81, and a communication allocation algorithm 82 (FIG. 8). The phase 1 search algorithm 80 allocates 100% of the communication resources (i.e. time slots) to a search for neighboring nodes. Diagram A of FIG. 6 includes five nodes 11, 13, 15, 17, and 19 that are capable of communicating with each other, but are currently unaware of the presence of the other. Each of the nodes 11, 13, 15, 17, and 19 is performing the phase 1 search algorithm 80 to identify neighboring nodes. The operations of the phase 2 search algorithm 81 begin after identification of a neighboring communication node. In an operation 84 the communication node synchronizes with the identified neighboring communication node to form a first network. For example, node 13 identifies node 11 to form a first ad hoc network 110 and node 17 identifies node 15 to form a second ad hoc network 112 as shown with reference to diagram B of FIG. 6.

Using current communication allocation protocols, the nodes 13, 11; 17, 15 of each network 110, 112 begin to utilize the communication resources for communication between the nodes with only a very small percentage of the resources reserved to continue to locate other neighboring nodes resulting in significant delays in merging the first network 110 with the second network 112 and in locating node 19. In contrast, in an operation 86, only a small number of communication resources are allocated to communication between the nodes 13 and 11 and 17 and 15 of each network 110, 112. The nodes 13, 11; 17, 15 exchange only control information required to support continued synchronization with the identified nodes. In an operation 88, all of the remaining time slots continue to be allocated to search for additional neighboring communication nodes. A determination is made in an operation 90, concerning identification of a new node. If no new node is identified during the time slot allocation cycle, processing continues at operation 102. If a new node is identified, in an operation 92, the identifying node synchronizes with the new node forming a third network. For example, as shown with reference to diagram C of FIG. 6, node 11 identifies node 19 forming a third network 114 including all of the nodes 11, 13, and 19. In an operation 94, a time reference for use by all of the nodes is selected. For example, the reference time of node 19 may differ from that to which nodes 11 and 13 have synchronized. A common time reference is selected for all nodes of the third network 114.

The new node may be part of a third network. For example, as shown with reference to diagram D of FIG. 6, node 13 identifies node 17 that is part of the second network 112. If the new node is not part of a third network, processing continues at operation 102 because the nodes have switched to a common time reference through the synchronization process. If the new node is part of a third network, the network required to change time reference to the time reference selected at operation 94 is selected. For example, the nodes of either the third network 114 or the second network 112 must change to the selected time reference. The network selection may utilize any numerically different parameter of the networks. For example, the network having the lowest/highest radio number, tail number, Internet protocol address, etc. may be used to select the network that switches to the selected time reference. A message is sent to the nodes of the selected network commanding a switch to the time reference in an operation 100. For example, as shown with reference to diagram E of FIG. 6, nodes 11, 13, 15, 17, 19 merge using a common time reference to form a network 116.

Figure 7:
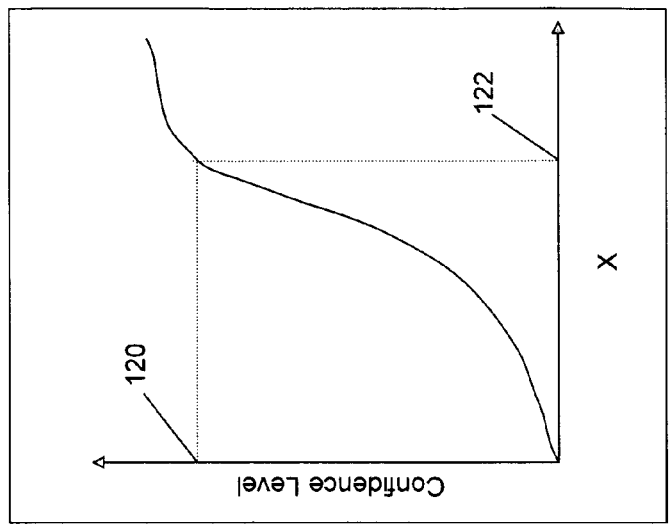
FIG. 7 is an exemplary plot of a confidence level used to determine a time to switch between a phase 2 search allocation algorithm and a communication allocation algorithm.

In an operation 102, a confidence level is determined. The confidence level estimates the likelihood that a communication node capable of communication with the network has not been identified. The confidence level may be calculated using a variety of parameters including time, the rate at which new nodes are identified, etc. A comparison of the calculated confidence level and a desired confidence level is made at an operation 76 to determine if the confidence level is achieved. For example, as shown with reference to FIG. 7, the confidence level may be plotted as a function of a parameter "X". Using a value of X, a confidence level is calculated. A desired confidence level at 120 may be defined as part of the system design. If the confidence level is not achieved, processing continues at operation 86 with a new allocation of time slots to the nodes of the network. If the confidence level is achieved, the nodes begin execution of the communication allocation algorithm 82.

With reference to FIG. 8, exemplary operations of the communication allocation algorithm 82 utilizing time slots allocated for use by any communication node 50 are described. In an operation 132, the communication node 50 in an active network, such as node 3 of the first network 12, receives an allocated set of time slots for transmission of one or more communication signal. In general, each node 1-5 of the first network 12 is assigned at least one time slot within each frame 30. The allocated set of time slots may be a single time slot.

In an operation 134, the communication node 50 processes the communication signal in the communication processing module 58 for the next allocated time slot. In an operation 136, the communication processing module 58 determines if it is still necessary to transmit the communication signal in the next allocated time slot. For example, the information to be transmitted in the communication signal may have timed out or otherwise no longer need to be transmitted. If it is still necessary to transmit the communication signal in the next allocated time slot, in an operation 138, the communication signal is transmitted during the time slot. If it is not necessary to transmit the communication signal in the next allocated time slot, in an operation 140, the communication node 50 tunes to a network synchronization frequency as known to those skilled in the art. The network synchronization frequency may be randomly selected from a set of network synchronization frequencies. Alternatively, the network synchronization frequency may be selected from a set of network synchronization frequencies based on a maximum time difference between the first network 12 and the second network 14 or other known or yet to be known techniques.

The communication node 50 listens for a communication signal from another network or another communication node 50 during the allocated time slot. Because the first network 12 allocated the time slot for transmission by the communication node 50, the remaining nodes of the first network 12 are not transmitting. In an operation 142, a determination is made as to whether or not a signal is received. If a signal is not received during the time slot, processing continues at an operation 146. If a signal is received, in an operation 144, the communication node 50 synchronizes with the transmitter of the signal as known to those skilled in the art. For example, the communication node 50 may receive a network synchronization signal from node f of the second network 14. As a result, the first network 12 merges with a network of the signal transmitter by synchronizing the network clocks and allocating time slots among the nodes in communication with both networks. In the operation 146, the existence of another time slot allocated to the communication node 50 is determined. If another time slot is allocated, processing continues at operation 134. If another time slot is not allocated, processing continues at operation 132.

Any number of nodes or networks can be merged using this methodology through any communication node of the network. Because using current TDMA protocols, the allocated time slot is wasted, no additional communication resources are used in synchronizing with the second network 14. The use of the wasted time slot to listen for network synchronization signals improves the statistical probability and time delay associated with merging the first network 12 with the second network 14. Preferably, each node of both the first network 12 and the second network 14 utilize otherwise wasted time slots in the manner described above.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments (which can be practiced separately or in combination) were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A communication node, the communication node comprising:
   a communication processing module, the communication processing module
   (a) executing a first search algorithm using a time division multiple access (TDMA) protocol, the TDMA protocol allocating a plurality of time slots, the first search algorithm allocating one or more time slot of the plurality of time slots to communicate control information with a first communication node and allocating remaining time slots of the plurality of time slots to identify a second communication node;
   (b) identifying the second communication node;
   (c) synchronizing with the second communication node to form a network including the first communication node and the identified second communication node;
   (d) calculating a confidence level wherein the confidence level estimates the likelihood that a third communication node capable of communication with the network has not been identified;
   (e) comparing the calculated confidence level to a desired confidence level; and
   (f) if the desired confidence level is not achieved, repeating (a)-(f); and
   a transceiver communicating the control information.

2. The communication node of claim 1, wherein the communication processing module executes a second search algorithm before (a)-(f), wherein the second search algorithm uses all of the plurality of time slots to identify the first communication node.

3. The communication node of claim 1, wherein the communication processing module executes a communication algorithm if the desired confidence level is achieved, wherein the communication algorithm comprises:
   receiving an allocated set of time slots for transmission of a communication signal;
   identifying a time slot of the allocated set of time slots that is no longer needed for transmission of the communication signal; and
   tuning to a network synchronization frequency during the identified time slot.

4. The communication node of claim 3, wherein the communication algorithm further comprises:
   receiving, during the identified time slot, a synchronization signal transmitted by a fourth communication node, wherein the fourth communication node is not in communication with the second network; and
   synchronizing with the fourth communication node using the synchronization signal thereby allowing communication between the fourth communication node and the second network.

5. The communication node of claim 1, wherein the second communication node is communicating with a third network.

6. The communication node of claim 5, further comprising selecting a time reference for the second network and the third network.

7. The communication node of claim 6, further comprising selecting a network from the second network and the third network to switch to the selected time reference.

8. The communication node of claim 7, further comprising sending a message to the selected network, the message directing the selected network to switch to the selected time reference.

9. The communication node of claim 7, wherein selecting the network uses a network identifier.

10. The communication node of claim 9, wherein the network identifier is selected from the group consisting of a radio number, a tail number, and an internet protocol address.

11. A method of allocating communication resources between communication nodes in a network of communication nodes to rapidly identify a new node capable of communication with the network, the method comprising:
   (a) executing a first search algorithm using a time division multiple access (TDMA) protocol, the TDMA protocol allocating a plurality of time slots, the first search algorithm allocating one or more time slot of the plurality of time slots to communicate control information with a first communication node and allocating remaining time slots of the plurality of time slots to identify a second communication node;
   (b) identifying the second communication node;
   (c) synchronizing with the second communication node to form a network including the first communication node and the identified second communication node;
   (d) calculating a confidence level wherein the confidence level estimates the likelihood that a third communication node capable of communication with the network has not been identified;
   (e) comparing the calculated confidence level to a desired confidence level; and (f) if the desired confidence level is not achieved, repeating (a)-(f).

12. The method of claim 11, further comprising executing a communication algorithm if the desired confidence level is achieved, wherein the communication algorithm comprises:
  receiving an allocated set of time slots for transmission of a communication signal;
  identifying a time slot of the allocated set of time slots that is no longer needed for transmission of the communication signal; and
  tuning to a network synchronization frequency during the identified time slot.

13. The method of claim 12, further comprising:
  receiving, during the identified time slot, a synchronization signal transmitted by a fourth communication node, wherein the fourth communication node is not in communication with the second network; and
  synchronizing with the fourth communication node using the synchronization signal thereby allowing communication between the fourth communication node and the second network.

14. The method of claim 11, wherein the second communication node is communicating with a third network.

15. The method of claim 14, further comprising selecting a time reference between the second network and the third network.

16. The method of claim 15, further comprising selecting a network from the second network and the third network to switch to the selected time reference.

17. The method of claim 16, further comprising sending a message to the selected network, the message directing the selected network to switch to the selected time reference.

18. The method of claim 16, wherein selecting the network uses a network identifier.

19. The method of claim 18, wherein the network identifier is selected from the group consisting of a radio number, a tail number, and an internet protocol address.

20. A computer-readable medium having computer-readable instructions stored thereon that, upon execution by a processor, cause the processor to allocate communication resources among a network of communication nodes to rapidly identify a new node capable of communication with the network, the instructions comprising:

(a) executing a first search algorithm using a time division multiple access (TDMA) protocol, the TDMA protocol allocating a plurality of time slots, the search algorithm allocating one or more time slot of the plurality of time slots to communicate control information with a first communication node and allocating remaining time slots of the plurality of time slots to identify a second communication node;

(b) identifying the second communication node;

(c) synchronizing with the second communication node to form a network including the first communication node and the identified second communication node;

(d) calculating a confidence level wherein the confidence level estimates the likelihood that a third communication node capable of communication with the network has not been identified;

(e) comparing the calculated confidence level to a desired confidence level; and (f) if the desired confidence level is not achieved, repeating (a)-(f).

* * * * *